(12) United States Patent  
Majmundar et al.

(10) Patent No.: US 7,463,884 B2  
(45) Date of Patent: Dec. 9, 2008

(54) SYSTEM AND METHOD FOR UPDATING DATA IN REMOTE DEVICES

(75) Inventors: Milap V. Majmundar, Austin, TX (US); David R. Wolter, Austin, TX (US)

(73) Assignee: AT&T Labs, Inc., Austin, TX (US)

( * ) Notice: Subject to any disclaimer, the term of this patent is extended or adjusted under 35 U.S.C. 154(b) by 288 days.

(21) Appl. No.: 11/223,571

(22) Filed: Sep. 9, 2005

(65) Prior Publication Data

US 2006/0025123 A1 Feb. 2, 2006

Related U.S. Application Data

(63) Continuation of application No. 10/201,103, filed on Jul. 23, 2002, now Pat. No. 6,970,698.

(51) Int. Cl.
  *H04M 3/00* (2006.01)
  *H04Q 7/20* (2006.01)
  *H04B 10/00* (2006.01)

(52) U.S. Cl. .................. 455/419; 455/418; 455/425; 455/512; 379/56.3

(58) Field of Classification Search ............... 455/419, 455/420, 418, 56.1, 53.1, 433; 709/240, 709/203
See application file for complete search history.

(56) References Cited

U.S. PATENT DOCUMENTS

| | | | |
|---|---|---|---|
| 5,553,315 A | 9/1996 | Sobti et al. | 455/56.1 |
| 5,974,312 A * | 10/1999 | Hayes et al. | 455/419 |
| 6,052,779 A | 4/2000 | Jackson et al. | 713/2 |
| 6,308,061 B1 * | 10/2001 | Criss et al. | 455/418 |
| 6,970,698 B2 * | 11/2005 | Majmundar et al. | 455/419 |
| 7,194,551 B1 * | 3/2007 | Moll et al. | 709/240 |

FOREIGN PATENT DOCUMENTS

| | | |
|---|---|---|
| DE | 19930170 A1 | 1/2001 |
| EP | 0959635 A1 | 11/1999 |
| WO | 02082834 A1 | 10/2002 |
| WO | 02087266 A1 | 10/2002 |

OTHER PUBLICATIONS

PCT International Search Report PCT/US03/22045, 7 pages.

* cited by examiner

*Primary Examiner*—Charles N Appiah
*Assistant Examiner*—Kiet Doan
(74) *Attorney, Agent, or Firm*—Jackson Walker L.L.P.

(57) ABSTRACT

A central host performs an automated method of updating multiple remote devices. In one embodiment, the host recognizes a predetermined download time and, in advance of the download time, transmits a calendar update to multiple remote devices. The calendar update includes the download time, and the remote devices may utilize the download time to set calendar reminders for entering an active state. Within a short time after reaching the download time, the host pushes download data to the remote devices by broadcasting the download data. In one aspect, the host may receive message acknowledgements from remote devices in response to a first calendar update, and the host may automatically transmit additional calendar updates to any remote devices that did not receive the first calendar update. Additional embodiments involve related methods and the terminal devices that receive the updates.

17 Claims, 2 Drawing Sheets

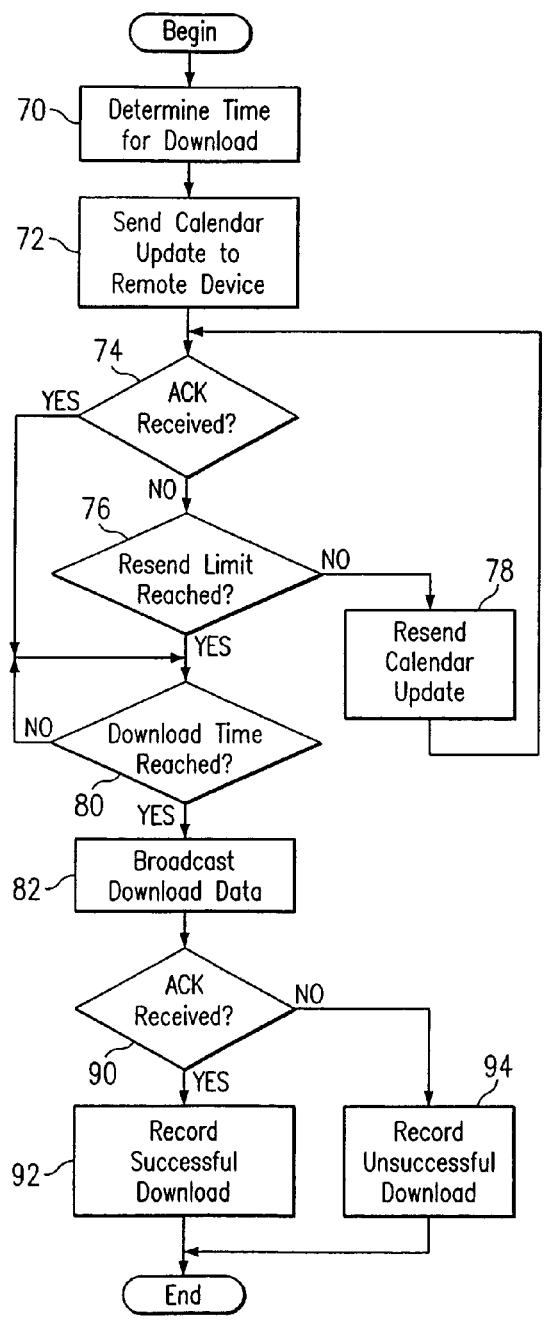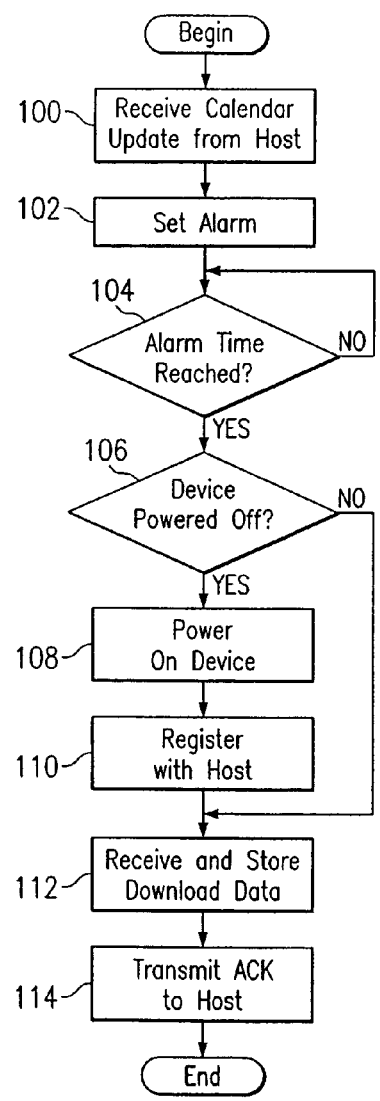

SYSTEM AND METHOD FOR UPDATING DATA IN REMOTE DEVICES

CROSS REFERENCE TO RELATED APPLICATION

This application is a continuation of U.S. patent application Ser. No. 10/201,103 entitled "System and Method for Updating Data in Remote Devices" filed by Milap V. Majmundar, et al. on Jul. 23, 2002 now U.S. Pat. No. 6,970,698, the contents of which are hereby incorporated by reference.

TECHNICAL FIELD OF THE INVENTION

The present invention relates in general to information handling systems and, in particular, to a system, a method, and a program product for updating data in remote devices.

BACKGROUND OF THE INVENTION

A wireless network may contain a central host and multiple wireless devices such as cell phones, personal digital assistants (PDAs), laptop computers, or other terminal devices. From time to time, it may be necessary to transfer software, configuration data, or other types of data from the host to the terminal devices. For example, the wireless network may use over-the-air service provisioning (OTASP) to download data to devices, to accomplish such tasks as activating new wireless services, changing existing wireless services, modifying manufacturer specific parameters, and facilitating authentication key generation. Furthermore, burgeoning technologies such as software defined radio (SDR) are expected to lead to an increased demand for downloads to terminal devices.

BRIEF DESCRIPTION OF THE DRAWINGS

A more complete understanding of the present invention and advantages thereof may be acquired by referring to the appended claims, the following description of one or more example embodiments, and the accompanying drawings, in which:

FIG. 4 depicts a flowchart of an example embodiment of a process, within the host of FIG. 1, for downloading data to terminal devices; and FIG. 5 depicts a flowchart of an example embodiment of a process for receiving download data at a terminal device from FIG. 1.

DETAILED DESCRIPTION OF EXAMPLE EMBODIMENT(S)

Figure 1:
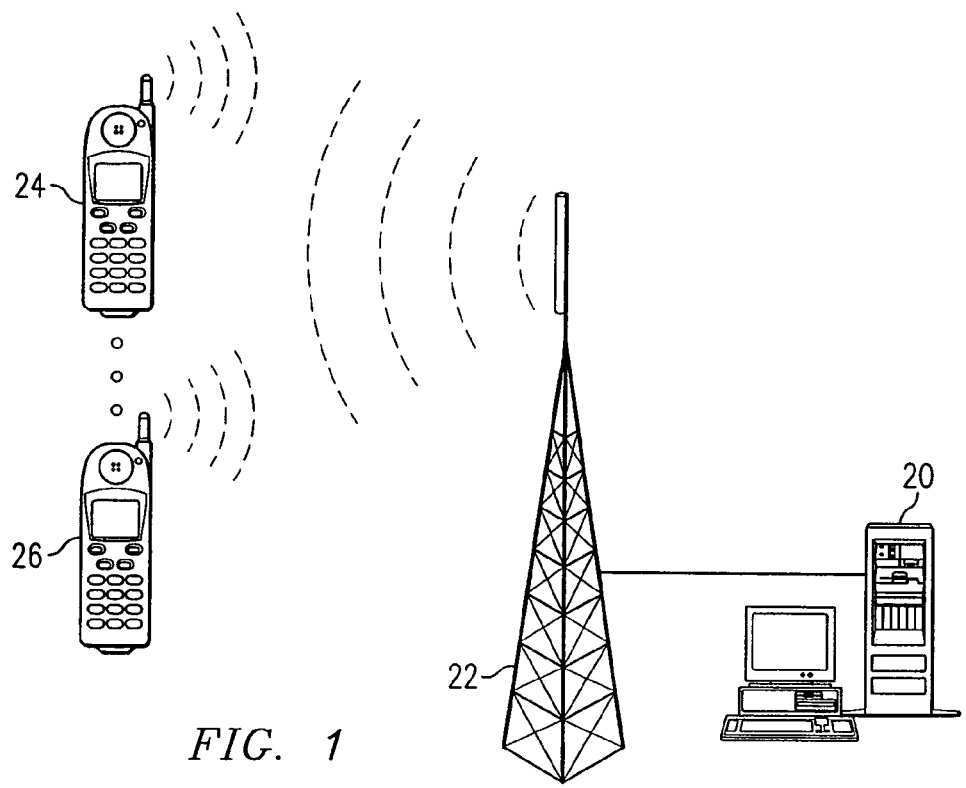
FIG. 1 depicts a schematic diagram of an example embodiment of a system that supports downloading data to terminal devices according to the present invention.

Currently, the two primary methodologies used for downloading data to terminal devices may be referred to as the "push methodology" and the "pull methodology," respectively. According to the pull methodology, the terminal devices initiate download operations. According to the push methodology, the host initiates download operations. For purposes of this document, the term "download" includes the operation of copying data from one device to another, without regard to whether to device that initiates the copying is also the device that receives the data. Thus, a host may download data to a terminal device by sending data to that terminal device.

For purposes of this document, the following terms are used to denote different terminal device states. "Dead" refers to the state in which no power is flowing through the device and no circuits are active. "Off" and "powered off" refer to the state in which most circuits are disabled to reduce power consumption, but a small amount of power is supplied to selected processing circuits, such as a clock circuit and a circuit that monitors the power button. "Sleep" refers to the state in which power consumption is reduced, relative to the fully on state, by disabling certain circuits and only enabling them periodically, for example to check for an incoming call, check on registration messages, etc. For instance, a terminal device may automatically enter a sleep state, from an on state, after a predetermined period of inactivity. "Fully On" refers to the state in which power is supplied to substantially all processing circuits. The term "powered on" includes the sleep and fully on states, but not the off and dead states. The term "on" may be used interchangeably with the term "powered on."

This document describes an example embodiment of a system and related methods for downloading data to terminal devices. As described in greater detail below, the disclosed system uses a push methodology that involves a preliminary push of calendar information to terminal devices, followed by a push of download data to the terminal devices. By pushing the calendar information in advance of the download data, the host prepares the terminal devices to receive the subsequent download data. In the example embodiment, the calendar information may cause any terminal devices that are powered off to "wake up" (e.g., power on) in anticipation of the download data. Consequently, the host is able to download data to terminal devices that might otherwise be powered off and therefore unable to receive transmissions. To facilitate this functionality, terminal devices in the example embodiment supply power to alarm circuitry while the devices are in the off state.

In addition, the disclosed embodiment may transmit the download data as a broadcast. Consequently, multiple terminal devices may receive the download data from a single transmission of that data. By contrast, conventional systems typically address individual transmissions of download data to individual devices, using transmission bandwidth to send separate communications to each terminal device.

Various advantages provided by the disclosed embodiment are described below, in connection with detailed descriptions of example components in the disclosed system and example processes involving those components.

FIG. 1 depicts a schematic diagram of an example embodiment of a system for downloading data to terminal devices according to the present invention. The illustrated system includes a host data processing system 20 in communication with a transmission facility such as a radio antenna 22. For instance, host 20 may serve, alone or in conjunction with other data processing systems, as a short message service center (SMSC). In addition, the system includes multiple terminal devices, such as cell phones 24 and 26, operable to communicate with host 20 via antenna 22.

Figure 2:
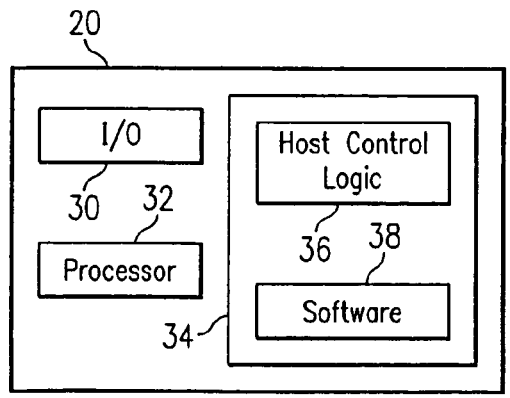
FIG. 2 depicts a block diagram of the example host from FIG. 1.

FIG. 2 depicts a block diagram of host 20 in greater detail. As illustrated, host 20 includes various processing resources. The processing resources may include hardware components such as an input/output (I/O) unit 30 for network communications, processing circuitry such as a processor 32, and one or more storage components 34 such as random access memory (RAM), non-volatile RAM (NVRAM), disk drives, etc. The processing resources may also include computer instructions, such as host control logic 36, encoded in storage components 34. Storage components 34 may also contain data, such as software 38, to be downloaded to terminal devices.

Figure 3:
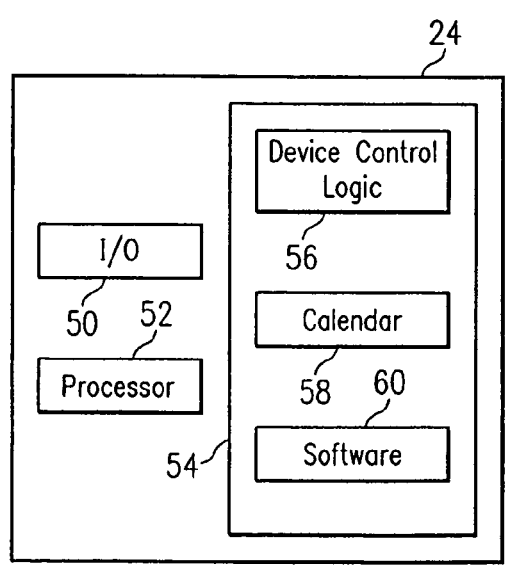
FIG. 3 depicts a block diagram of an example terminal device from FIG. 1.

FIG. 3 depicts a block diagram of cell phone 24 in greater detail. In the example embodiment, cell phone 24 also includes processing resources. Those processing resources may include, for example, hardware components such as an input/output (I/O) unit 50 for network communications, processing circuitry such as a processor 52, and one or more storage components 54 such as random access memory (RAM), non-volatile RAM (NVRAM), etc. Storage components 54 may be used to store computer instructions such as device control logic 56, as well as other types of data, such as calendar data, configuration data, user data, etc. When cell phone 24 receives download data (e.g., software 60) from host 20, that data may also be stored in storage components 54.

FIG. 4 depicts a flowchart of an example embodiment of a process, within host 20, for downloading data to terminal devices. The process begins with host 20 powered on and executing host control logic 36. In the example embodiment, host control logic 36 includes download management code for performing the operations described below.

At block 70, host control logic 36 recognizes a predetermined time to facilitate the downloading of data to multiple wireless terminal devices, such as cell phones 24 and 26. For instance, a network administrator may interact with host 20 on Monday to schedule a download of software 38 to cell phones 24 and 26 at 2:00 A.M. on the following Monday. In response to the administrator's input, host 20 may recognize 2:00 A.M. on the specified Monday as the predetermined download time. It may be preferable to schedule downloads at least one week in advance, to give host 20 a full week to try to send a calendar update to each terminal device, in case any of the terminal devices are usually turned off.

Further, the network administrator may also specify individual terminal devices or groups of devices to receive the download. For instance, the network administrator may use mobile identification numbers (MINs) to specify individual terminal devices to receive updates. Other means of differentiating between devices may be based on Electronic Serial Number (ESN), predefined device types (e.g., Class 2 devices), Medium Access Control (MAC) address, Internet Protocol (IP) address, etc.

At block 72, host control logic 36 begins sending a calendar update to each device that the administrator selected to receive the download. The calendar update, which may also be referred to as a calendar reminder, may include the time selected for the download. Host 20 may send those reminders to cell phones 24 and 26 as short messages using a protocol such as short message service (SMS), for instance. Host 20 may begin sending the calendar updates many hours or days in advance of the scheduled download, to provide time for repeated attempts to transmit the calendar update. Providing time to resend calendar updates is beneficial in case any of the terminal devices are unable to receive the first transmission, for instance as a result of a terminal device being powered off when the first calendar update is transmitted.

At block 74, host 20 may determine whether an acknowledgment (ACK) for the calendar update has been received from each terminal device. For each terminal device that has not replied with an ACK, host 20 may resend the calendar update repeatedly until a limit on the number of resend attempts for that terminal device is reached or the time for the download is reached, as indicated at blocks 76 and 78. In particular, when an ACK is not received, the host may wait for a preset time period before attempting to resend the calendar update. This waiting period may increase the probability that the terminal device might be powered on or within an area covered by the wireless signal when the calendar update is resent.

Also, the host may resend the update when the network realizes or determines that the device is powered on. For instance, when the terminal device powers on, it may register with a carrier, and, in response, the carrier may update databases such as a home location register and a visitor location register. The host may then determine whether the device is powered on by reference to information obtained from the carrier. In the example embodiment, the terminal device might never initiate communications with the host.

As described below with reference to FIG. 5, once a terminal device has received a calendar update, the terminal device may set an alarm to automatically enter an active state (e.g., wake up) in time to receive the download at the prescribed time.

At block 80, host 20 may determine whether the download time has been reached. Once the download time has been reached, host 20 may broadcast the download data, as indicated at block 82. At block 90, host 20 may determine whether each of the terminal devices has acknowledged receipt and storage of the download. Those messages with acknowledgements from the terminal devices may also be referred to as distribution acknowledgements. In response to receiving distribution acknowledgements, host 20 may automatically update distribution records within host 20 to indicate which terminal devices successfully received and stored the download data and which did not, as indicated at blocks 92 and 94. The process may then end.

In accordance with the above process, host 20 may push the download data to multiple terminal devices, such as cell phones 24 and 26, using a single transmission of the download data. For instance, a base station in a cell may transmit download data, such as new software, once in the cell, and multiple cell phones within the cell may each keep a copy of the download data found in that single transmission. By simultaneously pushing downloads from host 20 to multiple terminal devices, the disclosed methodology may use less bandwidth than would be necessary if a separate transmission were used to send the download data to each terminal device. In addition, downloads may be scheduled to avoid times of peak network utilization.

In one aspect, all terminal devices that detect the broadcast may accept, store, and acknowledge the download data. In another aspect, the terminal devices may be programmed to accept only certain kinds of broadcasts. For instance, the calendar update may only be sent to a predetermined set of selected terminal devices, and the short message with the calendar update may also include a key for the download data. Alternatively, a separate short message with the key may be sent to the selected terminal devices. The selected terminal devices may then store the key for future reference. Consequently, when the broadcast data is transmitted, the broadcast data may include a corresponding key, and each terminal device that detects the broadcast data may compare any keys previously received with the key in the broadcast data. A terminal device may disregard broadcast data if the terminal device does not have a corresponding key. Alternative methodologies for filtering broadcasts may be based on MIN, version number, or software load number, for example.

Numerous additional methodologies for filtering or directing broadcasts in accordance with the present invention will be readily apparent, as well. For instance, broadcasts may be transmitted at different times for different devices or different networks. Download data may even be transmitted to individual terminals one at a time.

FIG. 5 depicts a flowchart of an example embodiment of a process in cell phone 24 for receiving updates according to the present invention. That process may begin with cell phone 24 already "activated" according to a particular service plan for a user or subscriber. For instance, cell phone 24 may already be programmed with necessary codes, such as a MIN and a system identification code (SID).

At block 100, cell phone 24 receives a calendar update from host 20 specifying a download time. In response, device control logic 56 in cell phone 24 may automatically update calendar data 58 with an alarm, as indicated at block, 102. As described below, the alarm is set to cause cell phone 24 to automatically enter an active state shortly before the download time. Device control logic 56 may then monitor an internal clock and, if cell phone is powered off, device control logic 56 may automatically power on cell phone 24 when the time of the alarm is reached, as indicated at block 106 and 108. When first powered on, cell phone 24 may listen for a carrier SID on a control channel and send a registration request to the carrier, so the carrier can track the location of cell phone 24, as indicated at block 110. Cell phone 24 may then wait for host 20 to initiate the download.

At block 112, cell phone 24 may receive the download data from host 20 and store that data in storage components 54. For instance, if the download is for all terminal devices within range of antenna 22, cell phone 24 may simply receive and store the data. Alternatively, if host 20 has configured only particular terminal devices to receive the download (e.g., using one of the methodologies described above), cell phone 24 may only store the data after making a determination as to whether cell phone 24 is supposed to receive this download. For instance, cell phone 24 may receive and store a download key in association with the calendar update, and cell phone 24 may compare that key with a key in the download data before accepting the download data. After storing the download data, cell phone 24 may transmit an ACK to host 20 to indicate that the download data was successfully received and stored, as shown at block 113. The process may then end.

In the example embodiment, the calendar updates, the download data, and the ACKs may be transmitted using one or more control channels or traffic channels. For instance, a control channel for SMS broadcasts may be used to carry the download data. In alternative embodiments, other approaches may be used. For example, the system may use control channel dedicated to broadcasts for updating data in terminal devices, or the system may use a voice or data channel for the broadcast. In addition, download data may be transmitted in encrypted form, and the host may transmit a decryption key to each terminal device that is supposed to receive the download data, perhaps with the calendar reminder or at some other time before or after the download. Furthermore, terminal devices may acknowledge receipt only after successfully decrypting the download data. Also, for general broadcasts, such as a broadcast of download data for any device within listening range, acknowledgments may be omitted.

The disclosed processes thus allow network administrators or operators to manage network resources more effectively by scheduling downloads for times when network load is low, such as 2 A.M., and by reducing the number of times the download data must be transmitted. The disclosed processes help ensure that such a download is received, even though the terminal devices might normally be powered off at the time of the download. The disclosed processes also allow operators to disperse demands for network resources by scheduling downloads for different sets of terminal devices at different times. By contrast, in conventional systems that use the pull methodology, terminal devices may pull updates from the host on demand, at times determined by the terminal devices or the users. If the terminal devices control when updates are to be transmitted, there may be a much greater risk of overwhelming network resources.

Operators may use the disclosed processes to configure terminal devices with data for many different kinds services. For instance, the disclosed processes may be used to update preferred neighbor lists, to provide over-the-air activation, etc. The download data may contain information to be used by software in the terminal devices. For example, the download data may contain configuration parameters for device control software or data records such as phone numbers to call for various types of customer assistance. Download data may also contain software updates, such as a new version of an operating system, or new software applications for the terminal devices.

Additionally, once a terminal device receives the download data, the terminal device may reconfigure itself, based on that data. For example, a cell phone using SDR technology might use GSM signals according to a particular release of the GSM specification before receiving the download data. An enhanced version of the GSM specification may subsequently be released, and a host may then broadcast data to terminal devices to upgrade those devices to use GSM signals according to the enhanced specification. Alternatively, the host may transmit download data that causes the terminal devices to switch to a completely new generation of technology.

Similarly, firefighters or other emergency service personnel in one jurisdiction may be called to assist firefighters in a another jurisdiction, but incompatible radio systems may be used in those two jurisdictions, which may impair coordination of efforts when the firefighters arrive in the second jurisdiction. However, the disclosed methodology may be used to remove the incompatibility between the radio systems, for example by reconfiguring the radios from the first jurisdiction to interoperate with the radios in the second jurisdiction. For instance, the necessary data for reconfiguring the radios may be broadcast to the radios before the radios leave the first jurisdiction or after they arrive in the second jurisdiction.

In an alternative embodiment, a host may push download data such as software upgrades (e.g., the latest version of a web browser) to terminal devices such as personal computers (PCs). The host may first send calendar updates to the PCs to schedule a download for a time when the PCs will be idle or even powered off. The PCs may set an alarm to wake up in time for the download. At the scheduled time, the PCs may automatically power on if necessary and automatically establish a network connection. The download data may then be pushed or pulled to the PCs. For instance, the PCs may automatically log onto a predetermined host (e.g., as specified in the calendar update) and pull the download from that server. Alternatively, the download may be broadcast to the PCs. The PCs may then apply the update, reboot if necessary, and then turn themselves off. In addition, the host may provide for various kinds of user customization of the download process. For instance, the host may require user consent for participation in the automatic update process described above.

Although the present invention has been described with reference to various example embodiments, those with ordinary skill in the art will understand that numerous variations of those embodiments could be practiced without departing from the scope and spirit of the present invention. For example, although the example system of FIG. 1 depicts updates being sent to cell phones, many other types of terminal devices may be updated in accordance with the present invention. Examples of such devices may include, for example, personal computers, laptop computers, personal digital assistants (PDAs), SDRs, other nascent technologies, and future technologies. The terminal devices may be equipped for connectivity to wireless or wireline networks, for example via a public switched telephone network (PSTN), digital subscriber lines (DSLs), cable television (CATV) lines, etc.

In addition, one of ordinary skill will appreciate that alternative embodiments could be deployed with many variations in the number and type of devices in the system, the communication protocols, the system topology, the distribution of various software and data components among the hardware systems in the network, and myriad other details without departing from the present invention. For instance, although only one host is illustrated in the example embodiment, in alternative embodiments, additional hosts may be used, possibly with one host sending the calendar updates and a second host sending the download data.

Furthermore, the disclosed methodology may be used in wireline applications, as well. For instance, download data may be broadcast from a host to terminal devices via a shared wireline medium, such as a DSL or CATV lines with coaxial cable terminating in cable modems. Alternatively, download data may be broadcast simultaneously to multiple intermediate devices, and those intermediate devices may address the download data to individual terminal devices.

It should also be noted that the hardware and software components depicted in the example embodiment represent functional elements that are reasonably self-contained so that each can be designed, constructed, or updated substantially independently of the others. In alternative embodiments, however, it should be understood that the components may be implemented as hardware, software, or combinations of hardware and software for providing the functionality described and illustrated herein. In alternative embodiments, data processing systems incorporating the invention may include personal computers, mini computers, mainframe computers, distributed computing systems, and other suitable devices.

Alternative embodiments of the invention also include computer-usable media encoding logic such as computer instructions for performing the operations of the invention. Such computer-usable media may include, without limitation, storage media such as floppy disks, hard disks, CD-ROMs, read-only memory, and random access memory; as well as communications media such wires, optical fibers, microwaves, radio waves, and other electromagnetic or optical carriers. The control logic may also be referred to as a program product.

Many other aspects of the example embodiment may also be changed in alternative embodiments without departing from the scope and spirit of the invention. The scope of the invention is therefore not limited to the particulars of the embodiments or implementations illustrated herein, but is defined by the appended claims.

What is claimed is:

1. An automated method of downloading data from a central host to multiple remote wireless devices, the method comprising:
transmitting a first message from the host to each of the multiple remote wireless devices, the first message identifying a predetermined download time for a data download to the remote wireless devices such that the remote wireless devices can prepare to receive the data download;
automatically determining which of the multiple remote wireless devices did not receive the first message;
transmitting at least one second message from the host to each remote wireless device that did not receive the first message, the second message identifying the predetermined download time for the data download; and
substantially simultaneously broadcasting download data from the host to the multiple remote wireless devices such that the multiple remote wireless devices receive the download data from the host substantially simultaneously and store the download data,
wherein the first and second messages are usable by the multiple remote wireless devices to set calendar reminders in the multiple remote wireless devices for powering on or entering an active state allowing the download data to be received.

2. The method of claim 1, wherein the predetermined download time comprises an activation time for powering on the remote wireless devices.

3. The method of claim 1, further comprising:
receiving message receipt acknowledgements at the host from the remote wireless devices that receive the first message; and
automatically determining which of the multiple remote wireless devices did not receive the first message based at least on the received message receipt acknowledgements.

4. The method of claim 1, further comprising:
receiving distribution acknowledgements at the host from one or more of the multiple remote wireless devices indicating that the download data was received at the remote wireless devices; and
based at least on the received distribution acknowledgements, automatically updating distribution records to indicate which of the multiple remote wireless devices received the download data.

5. The method of claim 1, wherein the download data is broadcast to the remote wireless devices at or within a relatively short time after the predetermined download time.

6. The method of claim 1, wherein the download data comprises new software for the multiple remote devices.

7. The method of claim 1, wherein the download data comprises configuration settings for the multiple remote devices.

8. A computer program product comprising computer executable instructions, stored on a computer readable storage medium, for updating multiple remote devices from a central host, the instructions comprising instruction for:
transmitting a first message from the host to each of the multiple remote wireless devices, the first message identifying a predetermined download time for a data download to the remote wireless devices such that the remote wireless devices can prepare to receive the data download;
automatically determining which of the multiple remote wireless devices did not receive the first message;
transmitting at least one second message from the host to each remote wireless device that did not receive the first message, the second message identifying the predetermined download time for the data download; and
substantially simultaneously broadcasting download data from the host to the multiple remote wireless devices such that the multiple remote wireless devices receive the download data from the host substantially simultaneously and store the download data,
wherein the first and second messages are usable by the multiple remote wireless devices to set calendar reminders in the multiple remote wireless devices for entering an active state allowing the download data to be received.

9. The computer instructions of claim 8, further operable to perform operations comprising: receiving message receipt acknowledgements at the host from the remote wireless devices that receive the first message; and automatically determining which of the multiple remote wireless devices did not receive the first message based at least on the received message receipt acknowledgements.

10. The computer instructions of claim 8, further operable to perform operations comprising:
receiving distribution acknowledgements at the host from one or more of the multiple remote wireless devices indicating that the download data was received at the remote wireless devices; and
based at least on the received distribution acknowledgements, automatically updating distribution records to indicate which of the multiple remote wireless devices received the download data.

11. The computer instructions of claim 8, wherein the download data comprises new software for the multiple remote devices.

12. The computer instructions of claim 8, wherein the download data comprises configuration settings for the multiple remote devices.

13. A computer readable medium encoded with computer-executable instructions, wherein the computer instructions, wherein the computer-executable instructions, comprise instruction for:
transmitting a first message from the host to each of the multiple remote wireless devices, the first message identifying a predetermined download time for a data download to the remote wireless devices such that the remote wireless devices can prepare to receive the data download;
automatically determining which of the multiple remote wireless devices did not receive the first message;
transmitting at least one second message from the host to each remote wireless device that did not receive the first message, the second message identifying the predetermined download time for the data download; and
substantially simultaneously broadcasting download data from the host to the multiple remote wireless devices such that the multiple remote wireless devices receive the download data from the host substantially simultaneously and store the download data,
wherein the first and second messages are usable by the multiple remote wireless devices to set calendar reminders in the multiple remote wireless devices for entering an active state allowing the download data to be received.

14. The computer instructions of claim 13, further operable to perform operations comprising:
receiving message receipt acknowledgements at the host from the remote wireless devices that receive the first message; and
automatically determining which of the multiple remote wireless devices did not receive the first message based at least on the received message receipt acknowledgements.

15. The computer instructions of claim 13, further operable to perform operations comprising:
receiving distribution acknowledgements at the host from one or more of the multiple remote wireless devices indicating that the download data was received at the remote wireless devices; and
based at least on the received distribution acknowledgements, automatically updating distribution records to indicate which of the multiple remote wireless devices received the download data.

16. The computer instructions of claim 13, wherein the download data comprises new software for the multiple remote devices.

17. The computer instructions of claim 13, wherein the download data comprises configuration settings for the multiple remote devices.

* * * * *